May 16, 1961 J. C. GREENLEES, JR 2,984,216
PRESSURE CONTROLLED POSITIONER
Filed March 13, 1959
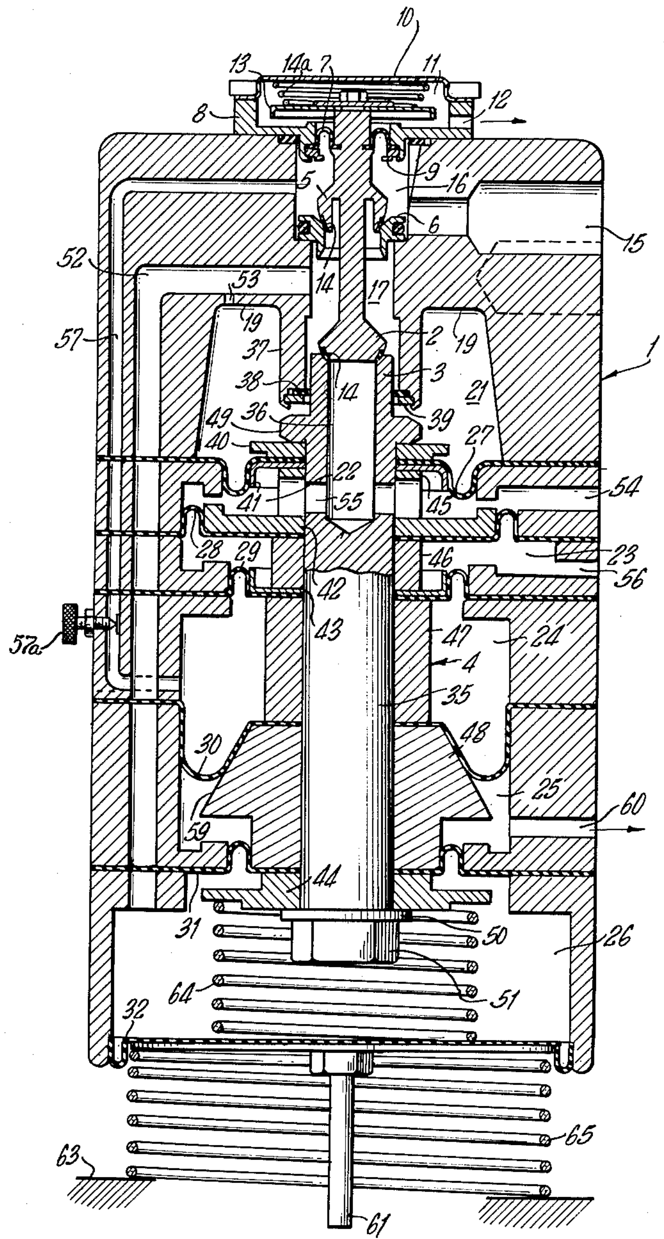
INVENTOR.
James C. Greenlees, Jr.
BY
Brumbaugh, Free, Graves & Donohue
ATTORNEY United States Patent Office 2,984,216

Patented May 16, 1961

1

2,984,216

PRESSURE CONTROLLED POSITIONER

James C. Greenlees, Jr., Oakdale, N.Y., assignor to Fairchild Engine and Airplane Corporation, Hagerstown, Md., a corporation of Maryland Filed Mar. 13, 1959, Ser. No. 799,225

6 Claims. (Cl. 121—41)

This invention relates to a pressure controlled positioner for regulating the position of a control element in response to a control signal. The pressure controlled positioner of the present invention is particularly suited for use as a valve positioning device.

In the pressure controlled positioner of the present invention, a relatively high pressure is provided to maintain the control element in an adjusted position or to move it to a new position of adjustment, thereby imparting a high degree of stability to the control element. Notwithstanding the inherent stability of the actuator, the adjustment of the control element is practically instantaneous in response to a relatively small variation in a control pressure.

The pressure controlled positioner comprises a housing containing relatively movable valve and valve seat elements and actuating means for imparting relative movement to the valve and valve seat elements. A relatively high and constant supply pressure is delivered to the housing, and this supply pressure is utilized to maintain the control element in an adjusted position or to reposition it in response to a variation in the control signal. One of the valve elements is positioned by a plurality of movable members which define a plurality of pressure chambers within the housing. One of the chambers thus defined is in communication with a variable pressure control signal; another is a chamber in which the fluid therein exerts a variable force which influences the response of the valve element to variations in the control signal. In the pressure controlled positioner of the present invention, this variable force is utilized in positioning the movable valve element to provide the desired relationship between the change in control pressure and the displacement of the control elements.

For a complete understanding of the invention, reference may be made to the detailed description which follows and to the accompanying drawing which is an elevational view in cross-section of a system in which the pressure control positioner of the present invention functions as a valve positioner.

Referring to the drawing, the components of the pressure controlled positioner of the present invention are accommodated within a housing 1. The upper end of the housing contains a movable valve 2 and the actuating means to be described for controlling the position of the valve. A movable valve seat 3 is accommodated within the housing 1 below the valve 2. The valve seat is part of an assembly, generally designated by the reference numeral 4, which moves as a unit.

The valve 2 is connected in tandem with a valve 5 located directly above it. The valve 5 moves with respect to a valve seat 6 fixedly mounted within the housing. Both valves are connected to a flexible pressure controlled diaphragm 7 which serves as an actuator for both valves. The outer periphery of the diaphragm 7 is affixed to an annular support 8 by a snap ring 9. The annular support is fitted in the upper end of the housing 1, and a cover 10 is secured to the upper edge of the annular support,

2 forming a chamber 11 above the diaphragm 7. The chamber 11 is vented to atmosphere by an opening 12 in the annular support.

The upper end of the valve stem of the tandem valves 2 and 5 projects into the chamber 10 and has affixed thereto a spring retaining member 13. A compressed tapered spring 14 is interposed between the spring retaining member and the cover, exerting a downward force on the diaphragm 7 and the valves 2 and 5, urging them against their respective valve seats 3 and 6. Both valves, however, are formed with notches 14 to provide a small flow of fluid therethrough even when the valves are seated.

Although a compressed spring **14*a* urges the valves 2 and 5 to closed positions, air or other fluid under relatively high pressure is supplied through an inlet port 15 of the housing to a chamber 16 defined between the valve 5 and the diaphragm 7. The pressure of the fluid within the chamber 16 exerts a force against the diaphragm 7 which lifts and unseats the valves 2 and 5. The unseating of the valve 5 permits the fluid to flow through the passage defined between the valve 5 and the valve seat 6 to a chamber 17 between the valves 2 and 5**.

The lower portion of the housing 1 below the wall 19 is subdivided into a plurality of chambers 21, 22, 23, 24, 25 and 26 by the movable, flexible diaphragms 27, 28, 29, 30, 31 and 32. The outer peripheries of these diaphragms are affixed to the housing 1, and the inner peripheries thereof are affixed to the movable valve seat unit 4.

The valve seat unit 4 is an assembly of elements carried by a vertically disposed rod 35 which passes through central openings in the movable diaphragms 27, 28, 29, 30, 31 and 32. The extreme upper end of the rod 35 is formed with an axial bore 36 which for reasons which will be explained below, forms a fluid passage connecting the chambers 17 and 22. The valve seat 3, forms the inlet end of this passage, and the spacing between the valve 2 and the valve seat 3 determines the rate of flow of the fluid therethrough. The radial ports 55 connect the axial bore 36 with the chamber 22.

The upper end of the rod 35 is received within a tubular portion 37 of the housing which depends in a downward direction from the wall 19. The rod is guided for axial displacement relative to the tubular portion 37 by the ring seal 38 locked to the lower end of the tubular portion 37 by the snap ring 39.

The valve seat 4 comprises an assemblage of elements which are carried by the rod 35 between an enlarged portion 49 thereof at the upper end of the rod and a washer 50 affixed to the lower end of the rod by a bolt 51. The elements affixed to the rod 35 include the discs 40, 41, 42, 43 and 44 which are adjacent movable diaphragms, and the annular members 45, 46, 47 and 48 which are interposed between the diaphragms.

The chamber 21 of the positioner is a damping chamber. The pressure within the chamber 21 exerts its damping effect against the upper surface of the movable diaphragm 27. To provide a slow bleed of fluid from or into the chamber 21 when the diaphragm 27 is displaced by movement of the valve seat unit 4, the chamber 21 is connected with a passage 52 by a restricted opening 53. The passage 52 establishes communication between the chambers 17 and 26. In lieu of the restricted opening 52, a small but sufficient amount of leakage can be provided through the seal 38.

The chamber 22, hereinafter sometimes referred to as the exhaust chamber, is vented to atmosphere through a port 54. Fluid from the chamber 17 flows through the passage defined between the valve 2 and valve seat 3 into the axial bore 36 in the rod 35 and thence through the radial ports 55 to the chamber 22.

The chamber 23, hereinafter sometimes referred to as the control pressure chamber, communicates with a source of variable pressure through a port 56. The variation in pressure within the chamber 23 controls the position of the valve seat unit 4. Displacement of the valve seat unit results from the fact that the effective area of the diaphragm 28 exposed to the chamber 23 is greater than the effective area of the diaphragm 29 exposed to the chamber 23. Thus, the control pressure in the chamber exerts an upward force on the valve seat unit 4 which varies as the control pressure within the chamber 23.

The chamber 24, hereinafter sometimes referred to as the compensating force chamber, communicates with the chamber 16 above the valve 5 through a passage 57. The chamber 24 is defined by the lower surface of the diaphragm 29 and the upper surface of the diaphragm 30. Since the effective area of the upper surface of the diaphragm 30 is greater than the effective area of the lower surface of the diaphragm 29, the pressure within the chamber 24 exerts a force on the valve seat unit 4 which, at least in part, counterbalances the upward force exerted by the control pressure. This counterbalancing force is a variable force which varies with the position of the valve seat unit. The variation results from the fact that the flexible diaphragm 30 abuts against the upper tapered surface 59 of the element 48. As the valve seat unit rises, the effective surface area of the flexible diaphragm 30 exposed to the chamber 24, that is to say, the horizontal component of that surface area, increases, thereby increasing the downward counterbalancing force exerted on the valve seat. On the other hand, when the valve seat unit is displaced downwardly, the effective surface area of the diaphragm 30 decreases, reducing the downward counterbalancing force exerted on the valve seat.

A variable restriction is provided in the passage 57 by the adjustable valve element **57*a*. The variable restriction provides damping in the chamber 24 for pressure variations that might occur in the chamber 16**.

The chamber 25 is vented to atmosphere through a port 60. The atmospheric pressure, which is substantially lower than the pressure in the chamber 24, exerts a substantially constant pressure against the underside of the diaphragm 30.

The chamber 26, as explained above, is connected to the chamber 17 by the passage 52. The chamber 26 is defined between the diaphragms 31 and 32. The lower diaphragm 32 has control rod 61 affixed to the underside thereof. This control rod is the element which is positioned by the pressure controlled positioner device of the present invention. The control rod 61 may, for example, be a valve stem of a valve to be positioned.

The housing 1 is stationary and mounted in fixed relationship to the spring retaining surface 63. A partly compressed spring 64 is accommodated in the chamber 26 between the diaphragms 31 and 32. Also, a partly compressed spring 65 is interposed between the diaphragm 32 and the surface 63.

In operation, the position of the movable diaphragm 32 and the control rod 61 to be positioned is regulated by the pressure in the control chamber 23. A relatively high, constant supply pressure of air or other fluid is admitted into the chamber 16 of the housing 1 through the passage 15. The pressure within the chamber 16 acts against the movable diaphragm 7, exerting a force thereon in opposition to the force exerted by the compressed spring **14*a* to position the valve 5 a predetermined distance above its valve seat 6. The position of the valve seat unit 4 is determined by the force balance system described below. The position of the movable diaphragm 32, and also the control rod 61 connected thereto, is determined by the pressure within the chamber 26 which, as explained above, communicates with the chamber 17 via the passage 52. The pressure within the chamber 17 is determined by the spacing between the valve 2 and valve seat 3. The fluid flowing through the passage defined between the valve 2 and the valve seat 3 passes into the exhaust chamber 22 from which it is vented through the vent 54. Thus, as the separation between the valve 2 and valve seat 3 increases, the pressure within the chambers 17 and 26 decreases, moving the control rod 61 upwardly. On the other hand, as the spacing between the valve 2 and valve seat 3 diminishes, the pressure within the chambers 17 and 26 increases, moving the control rod 61** in a downward direction.

In a given position of equilibrium of the valve seat unit 4, the control 61 occupies a predetermined position. If then the control pressure within the chamber 23 is increased, the valve seat unit 4 will be displaced upwardly due to the larger effective area of the diaphragm 28 in comparison to the effective area of the diaphragm 29. The upward movement of the valve seat unit 4 moves the valve seat 3 thereof closer to the valve 2, thereby diminishing the rate of exhaust of the fluid from the chamber 17. As explained above, by thus reducing the rate of discharge of the fluid from the chamber 17, the pressure increases within the chamber 17 and also within the chamber 26 which is in communication therewith. This increase of pressure within the chamber 26 displaces the movable diaphragm 32 and the control rod 61 downwardly to a new position of equilibrium.

The new position of equilibrium of the upwardly moving valve seat unit 4 is determined by several factors, including the forces exerted by the springs 64 and 65 and change in the effective area of the diaphragm 30. As the control rod 61 is displaced downwardly, the spring 65 is compressed, and the spring 64 extended. In addition, as the valve seat unit 4 moves upwardly, the effective area of the diaphragm 30 increases due to the tapered shape of the member 48. As the effective area of the diaphragm 30 increases, the downward force exerted on the valve seat unit 4 also increases, ultimately establishing a new position of equilibrium for the valve seat unit which corresponds to the new control pressure within the control chamber 23. In this way, the desired relationship may be maintained between the variation in the control pressure and the displacement of the control element 61. For example, a straight line relationship therebetween can be maintained.

Similarly, when the control pressure within the chamber 23 is reduced, the valve seat unit 4 is displaced downwardly, increasing the separation between the valve 2 and the valve seat 3. This permits a greater flow of the fluid from the chamber 17 to the exhaust chamber 22, diminishing the pressure within the chamber 26. The reduction of pressure within the chamber 26 permits the spring 65 to displace the diaphragm 32 upwardly against the force exerted by the spring 64. The downward displacement of the valve seat unit 4 also moves the tapered member 48 in a downward direction, decreasing the effective area of the diaphragm 30, so that ultimately a new position of equilibrium of the valve seat unit 4 will be established, which corresponds to the reduction of pressure within the control chamber 23.

The invention has been shown in a single preferred form and by way of example, and, obviously, many variations and modifications may be made therein within the spirit of the invention. For example, in addition to the tapered member 48, which produces a variable counterbalancing force on the valve seat unit 4, it would be feasible to provide a pressure regulator for the chamber 24. In addition, the pressure in the chamber 24 may be cascaded with a signal from another source, if desired. The invention, therefore, is not to be limited to any specified form or embodiment except insofar as such limitations are expressly set forth in the appended claims.

I claim:

1. A pressure controlled positioner comprising a housing, a plurality of movable members within the housing defining a control pressure chamber which communicates with a control fluid of variable pressure, and a compensating force chamber, means for introducing a supply fluid under relatively high, constant pressure into said housing, a passage connecting the supply pressure with the compensating force chamber, a movable valve element connected to said movable members so as to be positioned thereby, said movable valve element controlling the rate of bleed of said supply fluid from the housing whereby the rate of bleed is controlled by the pressure within the control pressure chamber, a movable positioner, a pressure controlled actuator at one end of the housing for imparting movement to the positioner, the pressure transmitted to the actuator being influenced by the rate of bleed of the supply fluid from the housing, whereby the pressure transmitted to said actuator determines the adjustment of the positioner, means for introducing fluid under pressure into said compensating force chamber, and means for varying the effective area of one of the movable members which defines said compensating force chamber so as to impart a variable force on the movable element.

2. A pressure controlled positioner comprising a housing, a plurality of movable members within the housing defining a plurality of chambers including a control pressure chamber, an exhaust chamber and a compensating force chamber, the control pressure chamber communicating with a control fluid of variable pressure, a movable valve element connected to said movable members so as to be positioned thereby, means for introducing a supply fluid under relatively constant pressure into said housing, the position of said movable valve element regulating the rate of flow of said supply pressure to the exhaust chamber of the housing, a passage means establishing communication between the compensating force chamber and the supply pressure, a movable positioner, a pressure controlled actuator for imparting movement to the positioner, the supply pressure transmitted to the actuator increasing as the rate of bleed of the supply pressure to the exhaust chamber decreases and decreasing as the rate of bleed of said supply pressure to the exhaust chamber increases, the pressure transmitted to the actuator determining the position of adjustment of the positioner, and means for varying the effective area of one of the movable members which defines the compensating force chamber so as to impart a variable counterbalancing force on the movable valve element.

3. A pressure controlled positioner as set forth in claim 2 in which the means for varying the effective area of the movable member comprises means defining a tapered surface carried by the movable valve element.

4. A pressure controlled positioner as set forth in claim 2 in which the movable valve element contains a passage therein which communicates with the exhaust chamber, the end of said valve element defining a valve seat, and including a valve with respect to which the valve seat is movable.

5. A pressure controlled positioner as set forth in claim 4 including an actuator controlled by the pressure of the supply fluid for adjusting the position of said valve.

6. A pressure controlled positioner as set forth in claim 2 including a variable restriction in said passage means establishing communication between the compensating force chamber and the supply pressure.

References Cited in the file of this patent

UNITED STATES PATENTS

| | | |
|---|---|---|
| 2,755,812 | Garnett | July 24, 1956 |
| 2,811,138 | Clements | Oct. 29, 1957 |
| 2,825,361 | Seljos | Mar. 4, 1958 |
| 2,888,941 | Grogan | June 2, 1959 |